Figure 1:
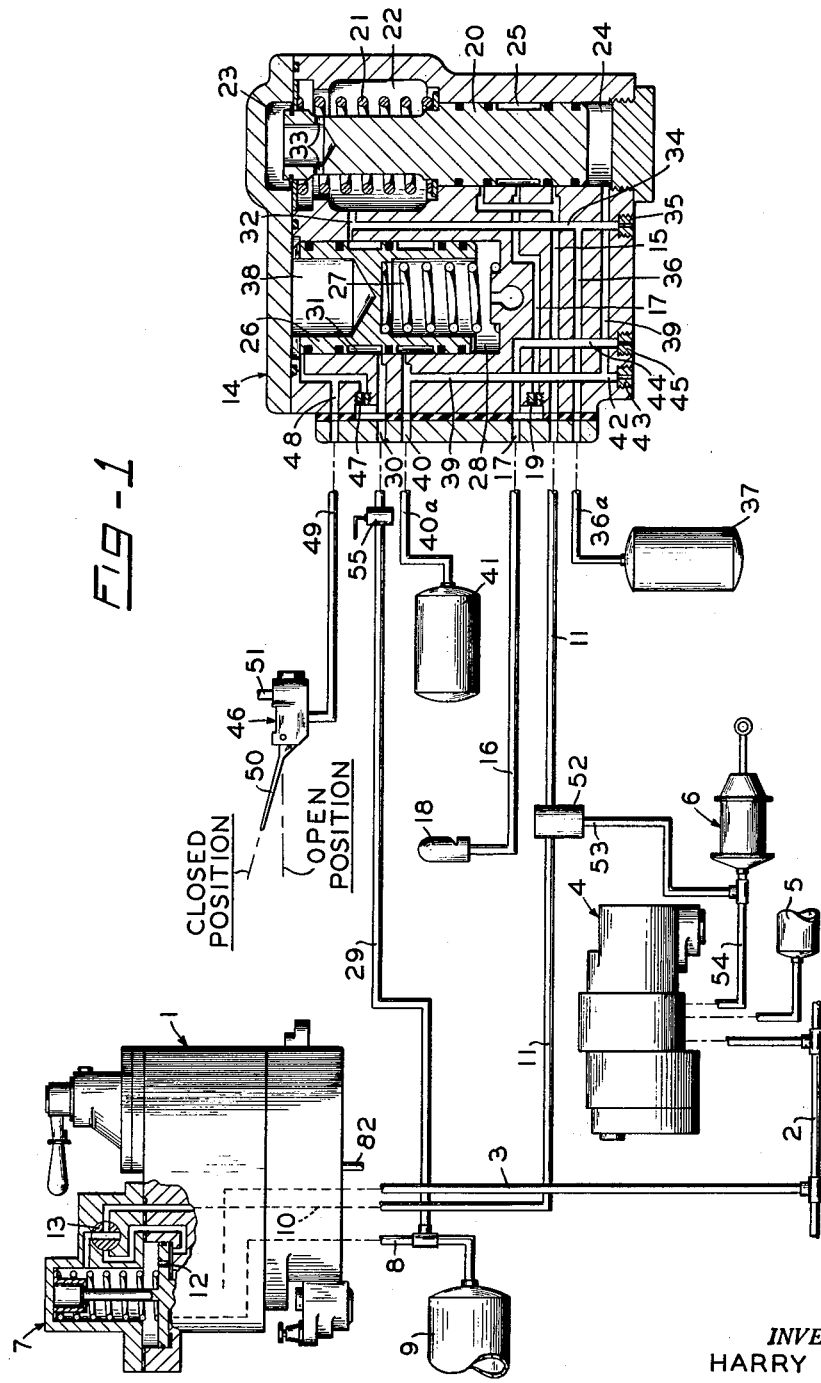

June 9, 1964

H. C. MAY 3,136,587

FLUID PRESSURE BRAKE APPARATUS WITH PERIODIC
ACKNOWLEDGEMENT TYPE SAFETY CONTROL

Filed Sept. 28, 1962

2 Sheets-Sheet 1

INVENTOR.
HARRY C. MAY

BY *A. A. Steinmiller*

ATTORNEY

INVENTOR.
HARRY C. MAY
BY
*A. A. Steinmiller*
ATTORNEY

United States Patent Office 3,136,587
Patented June 9, 1964

3,136,587
FLUID PRESSURE BRAKE APPARATUS WITH PERIODIC ACKNOWLEDGEMENT TYPE SAFETY CONTROL
Harry C. May, East McKeesport, Pa., assignor to Westinghouse Air Brake Company, Wilmerding, Pa., a corporation of Pennsylvania
Filed Sept. 28, 1962, Ser. No. 226,943
16 Claims. (Cl. 303—19)

This invention relates to fluid pressure operable brake apparatus with periodic acknowledgement safety control means which requires certain periodic acknowledging operations by the operator of the vehicle to forestall a penalty control operation, such as a brake application, which will otherwise be effected automatically by the safety control means should the operator fail to perform said acknowledgement operations.

A safety control device or apparatus may be associated with the braking system of a vehicle for the purpose of insuring that the vehicle brakes would be applied automatically in the event that the operator of a vehicle, such as a railway train, for example, becomes incapacitated for performing his duties. Some of the presently known devices such as a "dead-man" valve, which required that the operator keep his foot on a foot pedal associated therewith to prevent a brake application from being effected automatically, are inadequate in that the purpose thereof can be easily defeated by placing a weight on the foot pedal. Other safety control apparatus have been devised which require periodic acknowledging operations by the operator, the interval of frequency of such periodic acknowledging operations being determined in some instances by a fixed period of time, in others a fixed distance traveled by the vehicle, while in others the time interval is related to the rate of speed of the vehicle so that the higher the rate of speed, the shorter the time interval and hence the greater the frequency of acknowledgment operation. Some of the latter-mentioned apparatus are complex in structure and function and are, therefore, susceptible to malfunctioning and failure as well as being costly to produce.

The object of the present invention, therefore, is to provide an improved safety control apparatus of the periodic acknowledging type for use with fluid pressure brake apparatus and for use primarily with railway locomotive brake equipment, though not necessarily limited to such use, said improved safety control apparatus being characterized by simplicity in structure and, therefore, more reliability in operation. The invention, very briefly, comprises a safety control circuit interposed in the safety control pipe between the engineer's automatic brake valve and a warning device, such as a whistle, via which whistle fluid pressure may be restrictedly released from said control pipe. Reduction of fluid pressure in the control pipe, unless checked before reaching a certain low pressure value, will effect a penalty brake application of the emergency type. In order to prevent a penalty brake application, the operator is required to operate a foot pedal associated with a foot valve device, at predetermined intervals, to alternately effect supply and release of fluid pressure to and from opposite sides of a reciprocable pilot piston valve of a fluid pressure operable valve device whereby a shuttle piston valve associated therewith alternately opens and closes the control pipe to atmosphere. In the event the operator fails to operate the foot pedal within a permissible time limit, that is, before fluid pressure in the control pipe reduces to the critical low value, the control pipe will continue to blow down until the reduction of fluid pressure therein reaches said critical low value sufficient to effect a penalty brake application. The time interval between each cycle of operation is determined by timing volumes and respective choke means associated with the fluid pressure operable valve device for controlling fluid pressure build-up in said volumes and release of such fluid pressure therefrom.

Figure 2:
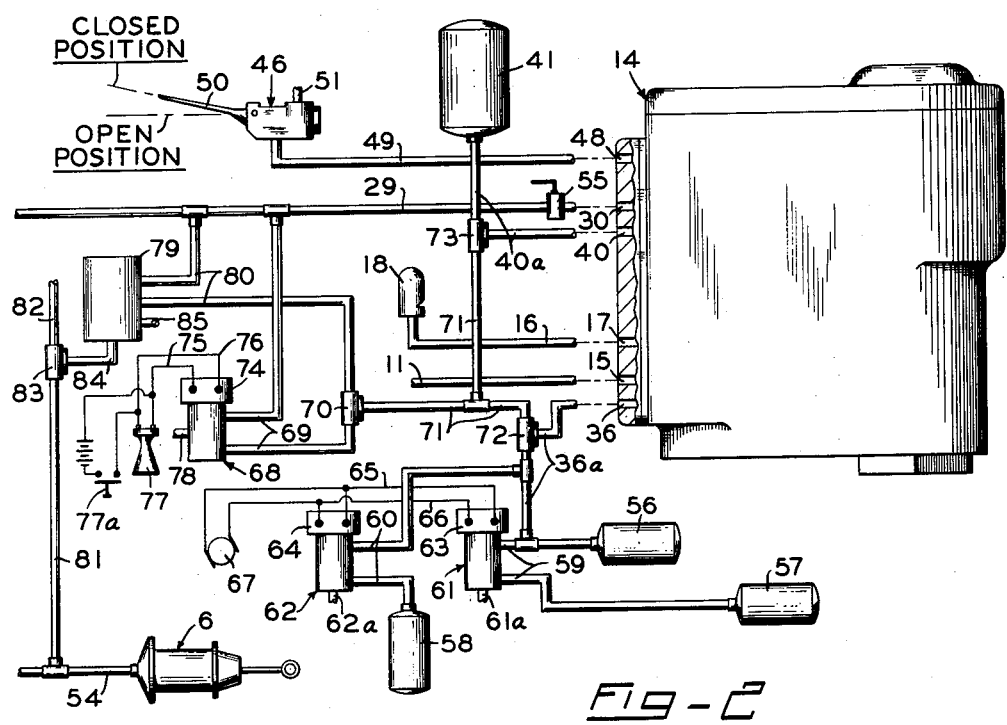
Figure 3:
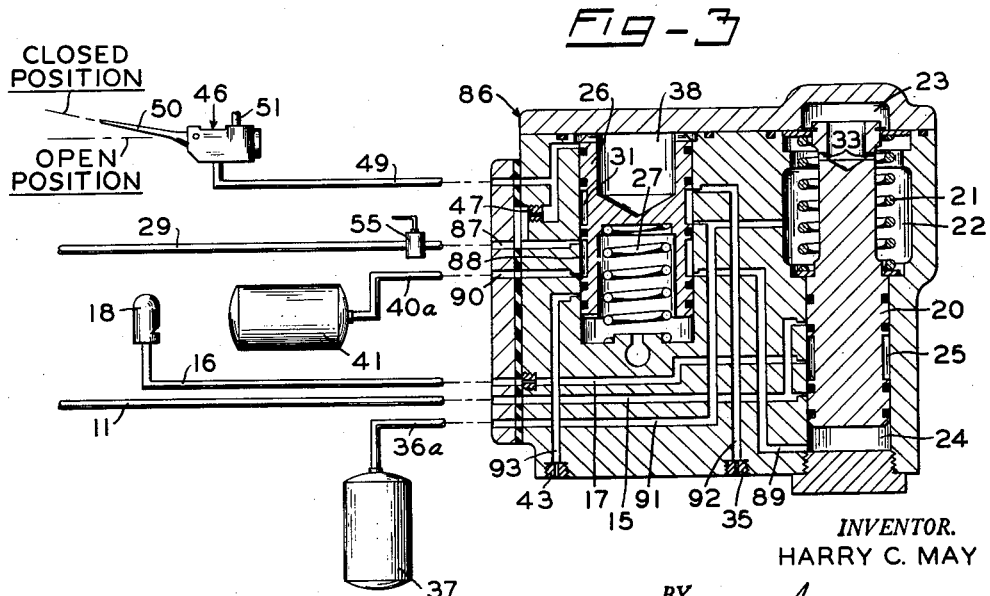

In the drawings, FIG. 1 shows a schematic arrangement, partly in section, of a safety control circuit with a brake system of a railway locomotive and embodying the invention;

FIG. 2 shows a portion, generally in outline, of the schematic arrangement shown in FIG. 1 with certain modifications for making the safety control circuit operatively responsive to vehicle speed; and FIG. 3 shows a portion, partly in section, of the schematic arrangement shown in FIG. 1 with a modified form of one component thereof.

*Description and Operation—FIG. 1*

For purposes of illustrating an application of the safety control apparatus embodying the invention, said apparatus is shown in the drawing, particularly in FIG. 1, as being operatively connected to brake control equipment of the fluid pressure operable type of a railway locomotive. The apparatus, as shown in FIG. 1, though being generally a representative embodiment of the invention, is not necessarily the preferred form which will be described later herein. The locomotive brake control equipment may be of any suitable type such as that fully described and illustrated in Instruction Pamphlet No. 5066, dated March 1957, and published by Westinghouse Air Brake Company, said brake control equipment being designated "24–RL Locomotive Brake Equipment." Since a detailed description of the brake control equipment is not deemed essential to an understanding of the invention, and since reference may be had to the above-mentioned publication, the brake control equipment, as shown in the drawing, will be only very briefly described. Such equipment comprises an engineer's automatic brake valve device 1 designated in the above-mentioned pamphlet as the "DS–24 Brake Valve" and manually operable by the engineer for controlling fluid pressure in a brake pipe 2 connected via a branch pipe or conduit 3 to said engineer's brake valve device. As is well known by those skilled in the art, operation of the engineer's brake valve device 1 for effecting a reduction of fluid pressure in the brake pipe 2 causes a brake control valve device 4, designated in the above-mentioned pamphlet as the "D–24 Control Valve," to effect supply of fluid under pressure from a source such as an auxiliary reservoir 5 to a brake cylinder device 6, whereby a brake application corresponding to the degree of reduction in brake pipe pressure is applied to the locomotive wheels (not shown). Operation of the automatic brake valve device 1 for effecting restoration of fluid pressure in the brake pipe 2 to a preselected normal value causes the brake control valve device 4 to effect venting of brake-applying pressure from the brake cylinder device 6 and thereby release of the brake application.

One of the components of the automatic brake valve device 1 is a service application portion 7 comprising valve means (not shown) operated by a piston subjected on one side to fluid pressure in a pressure chamber adjacent thereto, said chamber being supplied with fluid under pressure via a pipe 8 from a source, such as a main reservoir 9 which may be charged with fluid at a pressure of 140 p.s.i., for example, while the opposite side of said piston is subjected to the force of a biasing spring and fluid pressure in a control chamber adjacent thereto, said control chamber having one end of a safety control passage 10 opening thereinto, while the other end of said control passage connects to one end of a safety control pipe 11. Both the passage 10 and the pipe 11 are charged, at a restricted rate, from the main reservoir 9 via the pressure chamber and the control chamber of the service application portion 7, which are connected by a choked passage 12 extending through the piston from one side thereof to the other. When fluid pressure in the control passage 10 and, therefore, in the control chamber is reduced below a preselected critical low value such as 90 p.s.i., for example, the piston-operated valve means is actuated by the opposing pressure in the pressure chamber to a brake application position, whereby the automatic brake valve device 1 is actuated to cause a reduction of fluid pressure in brake pipe 2 for effecting a brake application, as above described. When fluid pressure in the control passage 10 is restored to a value above 90 p.s.i., the piston-operated valve means is returned to a normal position in which the brake valve device 1 effects restoration of normal fluid pressure in the brake pipe 2, and the control valve device 4 effects a release of the brake application.

It should be understood that each of the cars making up a train is provided with a brake control valve device similar to the brake control valve device 4 and that the brake pipe 2 extends the entire length of the train so that the brakes on the entire train are controlled from the engineer's automatic brake valve device 1.

In locomotive brake equipment of the type above described, the safety control passage 10 is normally connected via pipe 11 to a safety control device or devices such as the "dead man" or safety valve device, above described, and an audible or visible warning device for indicating that the safety control devices have been actuated in response to an emergency situation.

A cut-out cock 13, manually operable from the exterior of the automatic brake valve device 1, is interposed in safety control passage 10 between the control chamber of the service application portion 7 of said valve device and the pipe 11, whereby, in the event of undesirable pressure reduction in said safety control passage due to malfunctioning of the safety control devices or excessive leakage of fluid pressure in the safety control system, the cut-out cock may be operated to close off communication between said service application portion and the safety control devices to prevent untimely application of the brakes due to said malfunctioning of said safety control devices or excessive leakage therein.

According to the invention, a cyclically operable brake suppression valve device 14 is interposed between pipe 11, which is connected at the end opposite passageway 10 to one end of a passageway 15 formed in said suppression valve device, and a pipe 16, which connects at one end to one end of a passageway 17 formed in said suppression valve device, the other end of pipe 16 having connected thereto a signal device such as a whistle 18 via which pipe 11 may be vented to atmosphere, at a rate determined by a choke 19 interposed in said passageway 17, or cut off therefrom in a manner to be more fully described hereinafter. Communication or cut off of such communication between the other ends of the respective passageways 15 and 17, and therefore between pipe 11 and whistle 18 via pipe 16, is controlled by a shuttle piston valve 20 reciprocably operable in the suppression valve device 14.

The shuttle piston valve 20 is normally biased by a caged spring 21, disposed in a spring chamber 22 formed in the suppression valve device 14, to a neutral position in which communication between passageways 15 and 17 is cut off, and, therefore, venting of pipe 11 to atmosphere via pipe 16 and whistle 18 is prevented. The caged spring 21 is yieldable to permit axial movement of the shuttle piston valve 20 in either direction from its neutral position, as will presently be explained.

The shuttle piston valve 20 is alternately subjectable, in a manner to be described hereinafter, at opposite ends thereof to pressure of fluid supplied and released alternately to respective upper and lower chambers 23 and 24, as viewed in the drawing, formed in the suppression valve device 14 adjacent said opposite ends. With sufficient fluid pressure in upper chamber 23 to overcome the opposing force of spring 21, piston valve 20 is operatively responsive to said fluid pressure to move axially out of its neutral position to a first or lower venting position, as viewed in the drawing, in which passageways 15 and 17 are placed in communication with each other via an annular groove 25 formed on said piston valve and registering therewith, for venting pipe 11 to atmosphere via whistle 18, as above described. Unless such venting is terminated before expiration of a prescribed time interval, a penalty brake application will be effected by the application portion 7 of the engineer's brake valve 1. When fluid pressure is released from chamber 23 and supplied to chamber 24, as will later be described, piston valve 20 is shifted axially from its lower venting position to a second or upper venting position, as viewed in the drawing, in which passageways 15 and 17 are again placed in communication via groove 25 for venting pipe 11. The shuttle piston valve 20 does not shift directly from its lower venting position to its upper venting position, or vice versa, but hesitates momentarily in the neutral position for a prescribed time interval, as will presently be described.

Alternate supply and release of fluid pressure to and from the chambers 23 and 24 for operating the shuttle piston valve 20 is effected by a pilot piston valve 26 reciprocably operable within the suppression valve device 14. A spring 27 disposed in an atmospheric chamber 28 adjacent one end of pilot piston valve 26 acts to bias said pilot piston valve toward a first supply position in which chamber 23 is supplied with pressurized fluid from main reservoir 9 via pipe 8, a pipe 29 connecting said pipe 8 with one end of a supply passageway 30 formed in the suppression valve device 14, an annular groove 31 formed on said pilot piston valve and registering with the other end of passageway 30, a passageway 32 opening at one end to chamber 22 and registering at the other end with the annular groove 31 in the first supply position of the pilot piston valve, and a plurality of openings 33 formed in the shuttle piston valve 20 for connecting spring chamber 22 with chamber 23. A venting passageway 34 connects passageway 32 with an atmospheric choke 35 and, via a branch passageway 36, and a pipe 36a, with a timing volume or reservoir 37, so that the rate of fluid pressure build-up in chamber 23 is determined by the volume of said reservoir, which is charged with pressurized fluid concurrently with chamber 23, and the rate of escape flow through the choke 35. The rate of escape flow through choke 35 is such as to permit effective build-up of fluid pressure in chamber 23 at a certain rate higher than the rate at which fluid pressure is dissipated from volume 37 and chamber 24, as will later be described, for effecting operation of the shuttle piston valve 20 from its upper venting position to its lower venting position upon expiration of a predetermined time interval, as will later be explained.

A control chamber 38 is provided in the suppression valve device 14 adjacent the end of pilot piston valve 26 opposite the end on which spring 27 acts. When fluid pressure in control chamber 38 is permitted to build up, in a manner to be hereinafter disclosed, sufficiently for overcoming the opposing force of spring 27, such build-up of fluid pressure is effective for axially shifting the pilot piston valve 26 from its first supply position to a second supply position in which annular groove 31 is moved out of registry with passageway 32 to cut off further supply of pressurized fluid to chamber 23 and volume 37, the fluid pressure thus trapped therein continuing to dissipate to atmosphere via choke 35 at a restricted rate. At the same time groove 31, however, remains in registry with supply passageway 30 to place said supply passageway in communication with a venting passageway 39 connecting with lower chamber 24. Thus, with shifting of the pilot piston valve from its first supply position to its second supply position, supply of pressurized fluid from main reservoir 9 via pipes 8 and 28 is diverted from upper chamber 23 to lower chamber 24. Similarly to passageway 34, passageway 39 is connected by a branch passageway 40 and a pipe 40a to a timing volume or reservoir 41 and by a branch passageway 42 to an atmospheric choke 43, said timing volume and choke acting to determine the rate of build-up of fluid pressure in chamber 24 in a manner similar to that discussed above in connection with timing volume 37 and choke 35 for controlling build-up of fluid pressure in chamber 23.

Just as was noted above in connection with build-up of fluid pressure in chamber 23, that is, at a certain rate higher than the rate at which fluid pressure is dissipated from volume 37 and chamber 24 when the pilot piston valve 26 is in its first supply position, said dissipation occurring via atmospheric port 43, so is the rate of build-up in chamber 24 and volume 41 at a certain rate higher than the rate at which fluid pressure is dissipated from volume 37 and chamber 23 via choke 35 when said pilot piston valve is in its second supply position. This differential between rate of build-up and rate of dissipation of fluid pressure in and from, respectively, the chambers 23 and 24 is accomplished by providing unrestricted flow during supply of pressurized fluid to said chambers, but restricted flow during dissipation of fluid pressure therefrom via the respective chokes 35 and 43. Thus, due to this differential between the rate of build-up and rate of dissipation in and from, respectively, the chambers 23 and 24, the shuttle piston valve 20 does not shift immediately from its lower venting position to its upper venting position, or vice versa, in response to shifting of the pilot piston valve 26 from its second supply position to its first supply position, or vice versa, respectively, but in moving from one position to the other, said shuttle piston valve pauses momentarily in its neutral position during each of such movements for a prescribed interval of time in a manner and for a purpose to be disclosed hereinafter.

It should be apparent that operation of the pilot piston valve 26 between its first supply position and second supply position is effected by controlling build-up and reduction of fluid pressure in the control chamber 38. Thus by alternately effecting build-up and reduction of fluid pressure in the control chamber 38, cycling operation of the pilot piston valve 26 and, therefore, of the shuttle piston valve 20 is effected for alternately venting (when said shuttle piston valve is in either of its venting positions) and cutting off such venting (when said shuttle piston valve pauses momentarily in its neutral position) of safety control pipe 11 to atmosphere via choke 19, pipe 16 and whistle 18. Passageway 17, which is connected to whistle 18 via pipe 16, may also be connected to atmosphere via a branch passageway 44 and an atmospheric choke 45 for providing further tuning of the venting operation of control conduit 11.

A foot-pedal operated valve device 46 may be used for alternately effecting build-up and reduction of fluid pressure in control chamber 38 of the suppression valve device 14. Control chamber 38 is constantly connected to passageway 30, and, therefore, via pipes 8 and 29, to the source of pressurized fluid in main reservoir 9, by way of a choke 47 and a passageway 48. The passageway 48 is further connected via a pipe 49 to the foot valve device 46, which is operated by a foot pedal 50 pivotally mounted thereon. The function of the foot valve device 46 is to alternately close or open chamber 38 to atmosphere via passageway 48, conduit 49, the foot valve device and an exhaust port 51 provided thereon. Since the foot valve device 46 is a simple two-position device, it has not been shown in detail, but it will suffice to say that when the foot pedal 50 is in a raised or closed position, in which it is shown in the drawing, a valve (not shown) in said foot valve device occupies a closed position in which communication between conduit 49 and exhaust port 51 is cut off, and therefore control chamber 38 of the suppression valve device 14 is also cut off from atmosphere. When foot pedal 50 is operated to a lowered or open position, indicated by a broken line in the drawings, the valve in the foot valve device 46 is operated to an open position in which communication between pipe 49 and exhaust port 51 is open, and therefore control chamber 38 is open to atmosphere via passageway 48, pipe 49, through the foot valve device 46 and the exhaust port 51. Thus, by manual alternate operation of the foot pedal 50 of the foot valve device 46 to its open and closed positions, cycling operation, above described, of the suppression valve device 14 and, therefore, venting of control pipe 11 is effected.

It will be recalled that, as mentioned earlier herein, unless venting of control pipe 11 is terminated before expiration of a certain predetermined time interval, that is, before reduction of fluid pressure in said control pipe reaches the critical low value of 90 p.s.i., a penalty brake application will be effected. It was also noted above that control pipe 11 is vented to atmosphere when the shuttle piston valve 20 of the suppression valve device 14 is in either of its venting positions. Therefore, if the cycling action of the shuttle piston valve 20 were merely a continual shifting between its two venting positions, the control pipe 11 would be continually venting without termination thereof. Hence, the purpose of having the shuttle piston valve 20 pause for a prescribed interval of time in its neutral position, in which, it will be recalled, the control pipe 11 is cut off from atmosphere to allow fluid pressure in said control pipe to build up again to its normal high value of 140 p.s.i. during said time interval. The time interval during which the shuttle piston valve 20 remains and, therefore, the time lapsed for each complete cycle of operation of said shuttle piston valve in its neutral position is determined by the dimensions of timing volumes 37 and 41, the accumulative volumes of the pipes and passageways associated therewith and the respective rates of flow through the chokes 35 and 43.

To more clearly understand the manner in which the momentary pause of the shuttle piston valve 20 in its neutral position is accomplished when moving from one venting position to the other, it should be recalled that, as was briefly mentioned hereinbefore, supply of pressurized fluid to either of the chambers 23 and 24 and the respective reservoirs 37 and 41 is effected at a substantially unrestricted rate and, hence, any delay of build-up of fluid pressure in the chamber being charged is affected only in that part of the pressurized fluid supply that is being concurrently diverted to the timing volume connecting therewith and a relatively slight amount is escaping by way of the respective atmospheric choke connecting therewith. On the other hand, dissipation of opposing fluid pressure from the chamber and respective volume not being charged is restricted to the rate of flow provided by the respective atmospheric choke (of the chokes 35 and 43) connecting therewith. Thus, by way of example, assuming that the pilot piston valve 26 is in its second supply position, pressurized fluid is supplied to volume 41 and chamber 24 at a substantially unrestricted rate to thus build up fluid pressure in said chamber, without appreciable delay, sufficiently to act in conjunction with spring 21 for overcoming opposing fluid pressure trapped in chamber 23 and volume 37 to cause the shuttle piston valve 20 to be shifted, without delay, from its lower venting position to its neutral position, but not sufficiently to overcome the combined opposing force of said spring, which now opposes further movement of the shuttle piston valve beyond the neutral position and the fluid pressure trapped in chamber 23, said pressure trapped in chamber 23 (and volume 37) being permitted to dissipate only at the restricted rate determined by choke 35. After a predetermined period of time, however, that is, after pressure in volume 37 and chamber 23 has been reduced to a predetermined low value, fluid pressure in volume 41 and chamber 24 is effective for overcoming the combined opposing force of said low value pressure in chamber 23 and spring 21 for effecting further movement of piston valve 20 to its upper venting position. The pilot piston valve 26 and the shuttle piston valve 20 function cooperatively in a reverse manner to that immediately above described for effecting operation of said shuttle piston valve from its upper venting position to its neutral position, in which it pauses, and then to its lower venting position.

In considering the operation of the apparatus embodying the invention, as shown in FIG. 1 of the drawings, let it be assumed that said apparatus is mounted on a locomotive making up part of a train which, for the moment, is at a standstill. Let it further be assumed that the brake system is fully charged with pressurized fluid, that the brakes on the train are applied, and, therefore, the apparatus including the safety control passage 10 and the safety control pipe 11 are charged with fluid at a normal operating pressure such as 140 p.s.i., for example, from main reservoir 9 via pipe 8 and choke 12. When the apparatus is initially charged to place it in operating condition, chamber 23 of the suppression valve device 14 is immediately charged, as above described, with fluid at a pressure corresponding to that in reservoir 9, and the shuttle piston valve 20 is momentarily operated out of its neutral position to its lower venting position. Since the train is at a standstill, it may further be assumed that the foot pedal 50 of the foot valve device 46 is in its closed position and, therefore, fluid pressure in control chamber 38 of the suppression valve device 14 builds up sufficiently to effect operation of the pilot piston valve 26 to its second supply position and, consequently, operation of the shuttle piston valve 20 to its upper venting position in which control pipe 11 is placed in communication with pipe 16 and whistle 18.

With the train at a standstill, the foot pedal 50 is allowed to remain in its closed position, and, therefore, the pilot piston valve 26 will be maintained in its second supply position by fluid pressure in control chamber 38, and the shuttle piston valve 26 will be maintained in its upper venting position so that control pipe 11 remains open to atmosphere. Of course, a reduction of fluid pressure in control pipe 11 to the critical low value of 90 p.s.i. or lower would be inconsequential in effecting a brake application under the conditions immediately above described, because, as above noted, as long as the train is at a standstill, the brakes are in an applied state anyway. Allowing the control pipe 11 to remain open to atmosphere during such time, however, could result in excessive and unnecessary loss of pressurized fluid from the system.

To prevent excessive and unnecessary loss of pressurized fluid from the control pipe 11 during the time that the train is at a standstill, a cut-off valve device 52 is interposed in said control conduit between the engineer's brake valve device 1 and the suppression valve device 14. The cut-off valve device 52 is simply a two-position valve device including, though not shown, piston-operated valve means spring-biased toward an open position in which a supply communication (not shown) in the cut-off valve device is established to permit flow of pressurized fluid through pipe 11. The cut-off valve device 52 is provided with a pressure chamber (not shown) which is connected via a pipe 53 to a brake cylinder pipe 54 via which actuating fluid pressure is supplied to the brake cylinder 6 under the control of the control valve device 4, as above described. The piston-operated valve means in the cut-off valve device 52 is operable responsively to fluid in the control chamber above a predetermined pressure (such as a minimum of 25 p.s.i., for example, adequate for causing the brake cylinder 6 to effect a service brake application and adequate for overcoming the opposing force of the biasing spring acting on said piston-operated valve means), to a closed position in which communication through the cut-off valve device is closed. The cut-off valve device 52 is operative, therefore, in its closed position for preventing reduction of fluid pressure in the control pipe 11 and a resultant penalty brake application during such time that the train is at a standstill with the brakes applied or even when a brake application of 25 p.s.i. or more brake cylinder pressure is effected while the train is in motion. Since the penalty brake application, as above noted, would probably be in the nature of an emergency application, which, as is well known, is effected by complete venting of the brake pipe and therefore necessitates a longer time to recharge the brake pipe to release the brakes (as compared to a service application), it is desirable to prevent a penalty brake application, if possible, during the situations immediately above discussed. Of course, during such time that the train is at a standstill with the brakes applied or that a brake application of 25 p.s.i. or more brake cylinder pressure is in effect, the foot pedal 50 is allowed to remain in its closed position. Of course, as long as foot pedal 50 is in its closed position, pilot piston valve 26, due to fluid pressure in chamber 38, remains in its second supply position in which a certain amount of pressurized fluid from the supply pipe 29 is lost to atmosphere via passageway 30, groove 31, passageway 39 and choke 43, said loss, however, being of little or no consequence.

A cut-out cock 55 may be interposed in pipe 29 leading from the main reservoir 9, whereby, in the event that the safety control apparatus becomes defective and may possibly malfunction when the locomotive is on the road, said cut-out cock, which is normally sealed in an open position, may be operated to a closed position by breaking the seal to cut off pressurized fluid supply from the main reservoir 9 and thereby prevent operation of the suppression valve device 14 until the defect has been corrected. Closing of the cut-out cock 55 would also prevent bleeding of pressurized fluid via choke 43, as above described. The seal (not shown) on the cut-out cock 55 is intended to be broken only if malfunction of the apparatus necessitates cutting off the safety control apparatus. If the cut-out cock 55 is operated to its clsed position for arbitrarily thwarting operation of the safety control apparatus, the broken seal would so indicate.

In preparing to place the train in motion, the engineer operates the brake valve device 1 to effect restoration of fluid pressure in the brake pipe 2 to its normal value and thereby effect a release of fluid pressure in the brake cylinder 6 and release of the brake application. With release of fluid pressure from the brake cylinder device 6, the cut-off valve device 52 operates in the manner above described to restore communication through control pipe 11 and thereby venting of fluid pressure therefrom through the whistle 18 since, it will be recalled, the shuttle piston valve 20 is in its upper venting position at the time. With fluid pressure venting through whistle 18, said whistle emits a warning sound which apprises the engineer that unless such venting of pipe 11 is terminated, a penalty brake application will be effected. Upon hearing the warning sound of whistle 18 and an order to prevent the penalty brake application, the engineer, in demonstrating his alertness, depresses the foot pedal 50 of the foot valve device 46 to its open position, whereby control chamber 38 of the suppression valve device 14 is vented to atmosphere, and, in the manner above described, the consequential operation of the shuttle piston valve 20 from its upper venting position to, first, its neutral position in which venting of pipe 11 and the warning sound are momentarily terminated, and then, after the predetermined time interval, to its lower venting position, is effected.

Upon operation of the shuttle piston valve 20 to its lower venting position, whistle 18 again emits a warning sound in response to which the engineer operates the foot pedal 50 to its closed position to cut off control chamber 38 from atmosphere and thereby cause fluid pressure therein to build up to its certain high value in consequence of which, as above described, shuttle piston valve 20 is operated from its lower venting position to its neutral position, in which it pauses to cut off venting via whistle 18 and the warning sound, and then, after expiration of the prescribed time interval, moves on to its upper venting position. Again control pipe 11 is opened to atmosphere through whistle 18 which again emits a warning sound in response to which the engineer operates foot pedal 50 to its open position. Thus, as long as the train is in motion, the engineer must demonstrate his alertness by alternately operating the foot pedal 50 to its open and closed positions each time he hears the warning sound from the whistle 18 and thereby effect cycling operation of the suppression valve device 14 to prevent a penalty brake application in the manner above described, the frequency of such cycling being determined by the respective capacities of the various timing volumes and flow rates of the chokes in the apparatus.

*Description and Operation—FIG. 2*

As was noted above in connection with the apparatus shown in FIG. 1 of the drawings, the frequency of cycling of the suppression valve device 14 is determined essentially by the capacities of the timing volumes 37 and 41 and the flow rates of the chokes 35 and 43, said frequency being accordingly constant and unaffected by the rate of speed at which the train is traveling. It may be desirable, however, such as in the case of a passenger train which normally travels at higher rates of speed than a freight train, to have the engineer demonstrate his alertness at more frequent intervals than would be considered necessary in the case of a freight train. Hence, in FIG. 2 of the drawings, a schematic arrangement is shown whereby the frequency at which the engineer is required to demonstrate his alertness is determined by the speed at which the train is traveling. Basically, this is accomplished by providing a plurality of timing volumes and electro-magnetic valve devices, the latter being operable responsively to train speed for cutting out one or more of the timing volumes in response to higher speeds, whereby the time interval in which the shuttle piston valve 20 pauses in its neutral position is shortened and the frequency of cycling operation of the suppression valve device 14 is increased, or for cutting in additional timing volumes in response to lower speeds for decreasing the cycling frequency of said suppression valve device.

The arrangement, as shown in FIG. 2, generally comprises the apparatus as shown in FIG. 1 and, therefore, only a portion of the apparatus including the modifications is shown. The timing reservoir 37 comprising a component of the apparatus, as shown in FIG. 1, is replaced in the apparatus, as shown in FIG. 2, by a smaller timing volume or reservoir 56 connected in parallel relation with two other timing volumes or reservoirs 57 and 58 by way of respective pipes 59 and 60 in which are interposed respective electro-magnetic valve devices 61 and 62. The magnet valve devices 61 and 62 are each provided with respective solenoid devices 63 and 64 for operating respective valve means (not shown) in said valve devices, each of said valve means normally occupying an open position in which communication through the respective pipes 59 and 60 is open.

The solenoid devices 63 and 64 of the magnet valve devices 61 and 62 are connected in parallel relation by electrical conduits 65 and 66 to a speed-sensing device 67 of a well-known type, such as a speed-voltage generator operatively connected to one of the wheel axles (not shown) of the locomotive, said solenoids being respectively responsive to respective energizing voltages generated by the speed-sensing device at predetermined train speeds, such as in excess of 30 m.p.h. and 60 m.p.h., for example, for effecting sequential operation of the respective valve means in said magnet valve devices to respective closed positions in which communication through pipes 59 and 60, respectively, is sequentially closed, provided the train speed exceeds 60 m.p.h. otherwise communication through pipe 59 only is closed if the train speed exceeds 30 m.p.h. but not 60 m.p.h. Of course, as long as train speed is less than 30 m.p.h., communication through both pipes 59 and 60 remains open. Thus, when communication through pipe 59 or through both pipes 59 and 60 is closed, depending upon train speed, volume 57 or both volumes 57 and 58 are cut off from pipe 36a and the suppression valve device 14, said volumes, when thus cut off, being vented to atmosphere via vent ports 61a and 62a in the magnet valve devices 61 and 62, respectively. The net result of cutting out volume 57 or both volumes 57 and 58 is a corresponding shortening of the time interval during which the shuttle piston valve 20 of the suppression valve device 14 pauses in its neutral position during operation thereof from its lower venting position to its upper venting position since volumes 56, 57 and 58 are all connectable via passageways 36, 34 and 32 to the upper chamber 23 and, therefore, affect the timing or rate reduction of fluid pressure from said chamber to permit movement of said shuttle valve out of its said neutral position to its said upper venting position, as above described. Thus, by shortening the time interval during upward movement of the shuttle piston valve 20, the over-all time interval required for a complete cycle of operation of the suppression valve device 14 is accordingly reduced and the frequency of acknowledgement operation of the foot pedal 50 by the engineer is accordingly increased. It should be understood that a plurality of timing volumes of reduced capacities similar to volumes 56, 57 and 58 could be substituted for volume 41 and arranged in similar fashion as said volumes 56, 57 and 58 for affecting the reduction of fluid pressure from chamber 24.

A further modification of the apparatus as shown in FIG. 2 of the drawings comprises an electro-magnetic valve device 68 interposed in a pipe 69 having one end connected to pipe 29 leading from main reservoir 9 and the other end connected to one side of a double check valve device 70 (the purpose of which will be later disclosed), through which double check valve device said pipe 69 may be connected to a pipe 71 having two branches connected to respective double check valve devices 72 and 73 interposed, respectively, in pipes 36a and 40a for a purpose to be hereinafter mentioned.

The electro-magnetic valve device 68 comprises valve means (not shown) which normally occupies a closed position in which communication through pipe 69 is closed, and a solenoid device 74 which, when energized, effects operation of said valve means to an open position in which said communication through said pipes is open. The solenoid device 74 may be connected in parallel relation by electrical conduits 75 and 76 to one or more devices, such as an electrically operable locomotive horn 77, for example, which are actuated by some physical act of the engineer, such as by operating a push-button switch 77a for operating the horn, that would indicate his alertness. Thus, if the engineer actuates the locomotive horn 77a as a warning when approaching a grade crossing, the solenoid device 74 is energized to effect operation of the valve means to its open position.

With the valve means (not shown) of the magnet valve device 68 in its open position, pressurized fluid from main reservoir 9 and pipe 29 flows into pipe 69, said fluid pressure in pipe 69 causing the double check valve device 70 to operate to a first position to open communication between pipe 69 and pipe 71. Fluid pressure thus prevailing in pipe 69 causes respective valves (not shown) in the double check valve devices 72 and 73 to shift from one position, in which communications between the reservoirs 56 and 41 and the pipes 36a and 40a, respectively, are open, to another position in which said communications are closed and said pipes 36a and 40a are placed in communication with pipe 71. Pressurized fluid from supply pipe 29, via open pipe 69, through check valve 70, pipe 71, check valves 72 and 73 and pipes 36a and 40a, is thereby supplied concurrently to both chambers 23 and 24, whereby fluid pressure on both sides of the shuttle piston valve 20 is equalized to render the suppression valve device 14 inoperative during such time that the engineer is demonstrating alertness by operating other devices which are electrically connected to the solenoid device of the magnetic valve device 68. Thus, so long as the engineer is demonstrating his alertness in other ways, it is not necessary for him to operate the foot pedal 50 to avoid a penalty brake application. The magnet valve device 68 is provided with an atmospheric vent 78 via which fluid pressure in pipes 69 and 70 may escape to permit the respective valves in double check valve devices 72 and 73 to be restored to their respective positions in which communication through the respective pipes 36a and 40a is reopened when solenoid device 74 of said magnet valve device is deenergized.

A further modification of the apparatus, as shown in FIG. 2, comprises a valve device 79 interposed in a pipe 80 having one end connected to pipe 29 leading from main reservoir 9 and the other end connected to the side of double check valve device 70 opposite the side connecting to pipe 69. The valve device 79 includes valve means (not shown) which normally occupy a closed position in which communication through pipe 80 is closed, said valve means, however, being operable responsively to fluid pressure in a control chamber (not shown) formed in said relay valve device to an open position in which communication through pipe 80 is open. The control chamber in the valve device 79 is connectable via a pipe 81 to the brake cylinder supply pipe 54 and via a pipe 82 to a release passage in the automatic brake valve device 1 with a double check valve device 83 interposed at the juncture of said two pipes, the delivery side of said double check valve device being connected to said control chamber via a branch pipe 84.

When the engineer operates the brake valve device 1 to cause a predetermined degree of reduction of pressure in the brake pipe 2 for effecting a brake application corresponding to the degree of brake pipe pressure reduction, as above described, such reduction is effected by way of the above-mentioned release passage in said brake valve device. The pressure thus released from brake pipe 2 is transmitted via pipe 82, through check valve 83 and branch pipe 84 to the control chamber of the valve device 79 to cause the valve means therein to be operated to its open position, whereby pressurized fluid from main reservoir 9 via pipe 29 flows through pipe 80 to cause operation of the double check valve device 70 to establish communication between pipes 80 and 71. With fluid pressure from main reservoir 9 prevailing in pipe 71, such pressure is effective, in a manner similar to that discussed above in connection with the function of the electro-magnet valve device 68, to render the suppression valve device 14 inoperative immediately upon initiation of brake pipe reduction.

As a result of brake pipe pressure reduction, of course, supply of fluid under pressure, as above described, is effected to the brake cylinder device 6 via pipe 54, said pressure supplied to the brake cylinder normally being greater than that released from the brake pipe 2, and, therefore, being effective for operating double check valve device to cut off communication between pipes 82 and 84 and open communication between pipes 81 and 84 to permit fluid pressure from pipe 81 to act in the control chamber of relay device 79 for maintaining communication open through pipe 80. Moreover, once having attained the reduction determined by the engineer by operation of the brake valve device 1, further reduction and, therefore, release of fluid pressure from brake pipe 2 is automatically terminated so that such release pressure is no longer available to effect operation of the valve device 79 to open communication through pipe 80. But fluid pressure supplied to the brake cylinder device 6, as immediately above described, becomes effective for keeping communication through pipe 80 open. Thus, during the period of time from the instant a brake application is initiated until it is terminated or released, operation of the suppression valve device 14 (or 86, which can be connected in similar manner to the valve device 79) is cut out, and periodic operation of the foot pedal 50 by the engineer during said period of time is not necessary. Upon release of the brake application, the valve device 79 is restored to its closed position and the portion of pipe 80 adjacent double check valve device 71 is vented to atmosphere via a vent port 85 provided in the valve device 79.

*Description and Operation—FIG. 3*

Since the apparatus shown in FIG. 3 of the drawings is generally similar to that shown in FIG. 1, save for a modified suppression valve device 86 replacing the suppression valve device 14, only the pertinent components are shown in FIG. 3 wherein components identical to those in FIG. 1 are identified by identical reference numerals.

Similarly to the suppression valve device 14, the suppression valve device 86 is provided with a shuttle piston valve 20 and a pilot piston valve 26 which function in a cyclical fashion, under the control of the foot valve device 46, similarly to the shuttle piston valve and pilot piston valve in the suppression valve device 14. The principal difference between the two suppression valve devices 14 and 86 is that the several passageways in the latter are arranged in such a manner that, during such time that the respective chambers 23 and 24 and the timing reservoirs 37 and 41 connected thereto are being charged with pressurized fluid, said chambers and reservoirs are cut off from the respective chokes 35 and 43 and are placed in communication therewith only during such time that they are venting. This arrangement thus serves to conserve pressurized fluid by preventing loss to atmosphere via the chokes 35 and 43 as occurs with the suppression valve device 14 when chambers 23 and 24 are being charged, as above discussed.

By referring to FIG. 3 and assuming that control chamber 38 of the suppression valve device 86 has just been vented to atmosphere by operation of the foot pedal 50 to its open position, the pilot piston valve 26 is moved to its first supply position by spring 27. Pressurized fluid may then flow from pipe 29 (leading from main reservoir 9) to chamber 24 via a passageway 87, an annular recess or groove 88 formed on the pilot piston valve 26, and a passageway 89. At the same time, timing volume 41 is also charged with pressurized fluid from pipe 9 via groove 88 and a passageway 90. It should be noted, however, that during such simultaneous charging of chamber 24 and volume 41, neither of the passageways 89 or 90 connect with either of the atmospheric chokes 35 or 43, therefore, no fluid pressure escapes to atmosphere from chamber 24 and volume 41 during the charging thereof.

At the same time that chamber 24 and volume 41 are being charged with pressurized fluid, fluid pressure in chamber 23 and volume 37 is venting to atmosphere at a restricted rate via a passageway 91 opening to volume 37 and to chamber 23 (through chamber 22 and openings 33), the groove 31 and a venting passageway 92 leading to choke 35. With chamber 23 being vented at a restricted rate via choke 35, while chamber 24 is being charged with pressurized fluid, the shuttle piston valve 20 is operated, as above described, from its lower venting position to its neutral position, wherein it pauses for the prescribed time interval and then to its upper venting position, whereupon control pipe 11 is vented to atmosphere via passageway 15, groove 25 in shuttle piston valve, passageway 17 and whistle 18 which emits a warning sound.

Upon hearing the warning signal from whistle 18, the engineer operates the foot pedal to its closed position, whereupon, in the manner above described in connection with the suppression valve device 14, the pilot piston valve 26 is operated to its second supply position. With pilot piston valve 26 in its second supply position, groove 88 is out of registry with passageway 87 and in registry with a venting passageway 93 connecting with atmospheric choke 43 while also remaining in registry with passageway 89. At the same time, groove 31 moves into registry with passageways 87 and 91, whereby pressurized fluid is supplied from pipe 29 to chamber 23 and timing volume 37 via passageway 87, groove 31 and passageway 91, while fluid pressure in chamber 24 and volume 41 is vented to atmosphere, at a restricted rate, via respective passageways 89 and 90, groove 88, passageway 93 and choke 43. Again it should be noted that during the time that chamber 23 and volume 37 are being charged, there is no escape of pressurized fluid from said chamber and volume during the charging thereof.

With simultaneous charging of chamber 23 and volume 37 and venting of chamber 24 and volume 41, the shuttle piston valve 20 operates, as above described, from its upper venting position to its neutral position and then, after the prescribed time interval, to its lower venting position in which control pipe 11 is again vented to atmosphere via whistle 18. The engineer, upon hearing the warning signal from whistle 18, operates the foot pedal 50 to its open position. Hence, by timely operation of the foot pedal 50 alternately from one of its positions to the other each time the warning signal from whistle 18 sounds, cycling action of the suppression valve device 86 is effected similarly to that of suppression valve device 14 to prevent a penalty brake application. Of course, the suppression valve device 86 may be substituted for the suppression valve device 14 in the apparatus shown in FIGS. 1 and 2, respectively.

Having now described the invention, what I claim as new and desire to secure by Letters Patent, is:

1. A fluid pressure safety control system for use on a railway type vehicle, said safety control system comprising:
   (a) a control pipe normally charged with fluid at a preselected pressure and in which a reduction in excess of a certain amount from said preselected pressure is effective to initiate a penalty control operation,
   (b) a shuttle piston valve having two opposite sides which are subject to opposing fluid pressures for operating said shuttle piston valve sequentially out of a first venting position, in which a venting communication for effecting reduction of fluid pressure in said control pipe is opened, to a neutral position, in which said venting communication is closed and then to a second venting position in which said venting communication is again opened, and reversely in cycling fashion, upon alternate shifting, in opposite directions, of the differential force between said opposing fluid pressures,
   (c) a pilot piston valve having associated therewith biasing means for biasing said pilot piston valve toward a first supply position, in which supply of pressurized fluid is effected to one side of said shuttle piston valve while effecting release of fluid pressure from the opposite side thereof, said pilot piston valve being operable, in response to fluid pressure acting thereon in opposing relation to and in excess of the biasing effect of said biasing means, to a second supply position in which the supply of pressurized fluid is cut off from said one side of said shuttle piston valve and effected to said opposite side while release of fluid pressure is effected from said one side and terminated from said opposite side,
   (d) timing means for controlling the rate of build-up and reduction of pressurized fluid on said opposite sides of said shuttle piston valve, and
   (e) manually operable valve means for alternately causing build-up and reduction of pressurized fluid on said pilot piston valve for effecting operation thereof from its first to its second supply position and then from its second supply position to its first supply position.

2. A fluid pressure safety control system as claimed in claim 1, further characterized by caged spring means for biasing said shuttle piston valve to its said neutral position and for maintaining said shuttle piston valve in its said neutral position, while shifting from said first venting position to said second venting position and reversely, for a predetermined time interval determined by the time required by said timing means to cause a predetermined differential force to be built upon said shuttle piston valve sufficient to overcome the centering force exerted by said caged spring means.

3. A fluid pressure safety control system as defined in claim 1, further characterized by a warning device connected with said venting communication for emitting a warning signal each time said shuttle piston valve is operated to establish said venting communication in either its said first or second venting position.

4. The combination as defined in claim 2, wherein reduction of fluid pressure in said control pipe is effected via said warning device upon establishment of the venting communication.

5. A fluid pressure safety control system as defined in claim 1, wherein said timing means comprises timing reservoir means connected respectively to opposite sides of said shuttle piston valve, and choke means constantly bleeding fluid under pressure from said timing reservoir means for determining the interval of time required for each cycle of operation of said shuttle piston valve.

6. A fluid pressure safety control system as claimed in claim 5, for use on a vehicle, and further characterized in that at least one of said timing reservoir means comprises a plurality of separate reservoirs and by means sensitive to the speed of the vehicle for varying the number of said reservoirs which are available in accordance with variation in the vehicle speed.

7. A fluid pressure safety control system as defined in claim 1, wherein said timing means comprises respective timing reservoirs connected to opposite sides of said shuttle piston valve, and respective choke means open to atmosphere for controlling the rate of venting of fluid under pressure from said reservoirs and the respective side of said shuttle piston valve connected thereto, said choke means being connected by said pilot piston valve to the respective reservoirs during venting thereof and disconnected therefrom during charging thereof for determining the interval of time required for each cycle of operation of said shuttle piston valve 8. A fluid pressure safety control system as defined in claim 1, wherein said timing means comprises a plurality of timing reservoirs each of predetermined volume and connected, in parallel relation, to one side of said shuttle piston valve and respective valve devices associated with each of said timing reservoirs, said valve devices each normally occupying one position in which the respective timing reservoirs are open to said one side of said shuttle piston valve to provide a certain time interval for each cycle of operation of the shuttle piston valve and each being operable to a different position for cutting out the corresponding reservoir whereby to decrease the length of the time intervals required for each cycle of operation of said shuttle piston valve.

9. A fluid pressure safety control system as defined in claim 8, further characterized by a vehicle speed sensing device operative to control said valve devices associated with said timing reservoirs, said valve devices being operably responsve respectively to vehicle speeds above predetermined speeds for cutting out the respective timing reservoirs accordingly.

10. A fluid pressure safety control system for use on a railway type vehicle and comprising:
    (a) a control pipe normally charged with fluid at a preselected pressure and in which a reduction in excess of a certain amount from said preselected pressure is effective to initiate a penalty control operation,
    (b) a venting pipe constantly open to atmosphere and via which fluid under pressure may be released at a restricted rate from said control pipe,
    (c) a supply pipe via which fluid under pressure may be supplied,
    (d) a fluid pressure operable valve device comprising two oppositely disposed chambers and a control chamber and comprising:
        (i) a shuttle piston valve having two oppositely arranged sides subject respectively to the pressure in said oppositely disposed chambers supplied thereto via said supply pipe,
        (ii) said shuttle piston valve being biased to a neutral position, in which communication between said control pipe and said venting pipe is cut off, and being initially operable out of said neutral position, in response to a differential pressure between the respective opposing fluid pressures prevailing in said oppositely arranged chambers, to either a first venting position or a second venting position, depending upon the direction of the resultant differential force between said opposing fluid pressures, in which first and second venting positions said communication between said control pipe and said venting pipe is open,
        (iii) said shuttle piston valve thereafter being operable sequentially and cyclically out of one of said venting positions, to its said neutral position, to the other venting position and then reversely,
        (iv) a pilot piston valve having associated therewith biasing means for biasing said pilot piston valve toward a first supply position, in which said supply pipe is placed in communication with one of said oppositely arranged chambers,
        (v) said pilot piston valve being operable, in response to fluid pressure in said control chamber acting thereon in opposing relation to and in excess of the biasing effect of said biasing means, to a second supply position in which communication between said supply pipe and said one chamber is cut off and said supply pipe is placed in communication with the other of said oppositely arranged chambers,
        (vi) said fluid pressure valve device having provided therein respective venting passageways via which said oppositely arranged chambers are alternately vented to atmosphere at a restricted rate by alternate operation of said pilot piston valve between its said second and said first supply positions, respectively,
    (e) timing means interlocked with said supply pipe and said venting passageways for controlling the respective rates of supply and release of pressurized fluid to and from said oppositely arranged chambers whereby to determine the interval of time required for each cycle of operation of said shuttle piston valve, and
    (f) manually operable valve means for alternately effecting supply and release of pressurized fluid to and from said control chamber.

11. In a fluid pressure brake system for a railway type vehicle, the combination of:
    (a) a brake pipe normally charged with fluid at a predetermined pressure,
    (b) a brake cylinder device operable responsively to fluid pressure for effecting a brake application on the vehicle according to the degree of fluid pressure applied thereto,
    (c) a control valve device operable responsively to a reduction of fluid pressure in said brake pipe for effecting supply of fluid to the brake cylinder to a degree according to the degree of reduction in said brake pipe pressure,
    (d) application valve means operative to effect a reduction of fluid pressure in the brake pipe,
    (e) a control pipe normally charged with fluid at a preselected pressure and effective upon a reduction in excess of a certain amount from said preselected pressure for effecting operation of the application valve means to cause a reduction of fluid pressure in the brake pipe to effect a penalty brake application,
    (f) a shuttle piston valve having two opposite sides which are subject to opposing fluid pressure for operating said shuttle piston valve sequentially out of a first venting position, in which a venting communication for effecting reduction of fluid pressure in said control pipe is opened, to a neutral position, in which said venting communication is closed, and then to a second venting position in which said venting communication is again opened, and reversely in cycling fashion, upon alternate shifting, in opposite directions, of the differential force between said opposing fluid pressures,
    (g) a pilot piston valve having associated therewith biasing means for biasing said pilot piston valve toward a first supply position, in which supply of pressurized fluid is effected to one side of said shuttle piston valve while affecting release of fluid pressure from the opposite side thereof,
    (h) said pilot piston valve being operable, in response to fluid pressure acting thereon in opposing relation to and in excess of the biasing effect of said biasing means, to a second supply position in which supply of pressurized fluid is cut off from said one side of said shuttle piston valve and effected to said opposite side while release of fluid pressure from said opposite side is terminated and effected from said one side,
    (i) timing means for controlling the rate of build-up and reduction of pressurized fluid on said opposite sides of said shuttle piston valve, and
    (j) manually operable valve means for alternately causing build-up and reduction of pressurized fluid on said pilot piston valve for effecting operation thereof from its first to its second supply position and then from its second supply position to its first supply position.

12. A fluid pressure brake system as defined in claim 11, further characterized by pressure responsive cut-off valve means interposed in said control pipe and normally occupying an open position in which communication through said control pipe is open, said cut-off valve means being operable responsively to a preselected pressure in the brake cylinder for closing said communication through the control pipe.

13. A fluid pressure brake system as defined in claim 11, further characterized by a pressure fluid supply pipe, via which operating pressurized fluid is supplied to said shuttle piston valve, and a valve device interposed in a connecting pipe between said shuttle piston valve and said supply pipe, said valve device normally occupying a closed position, in which communication through said connecting pipe is closed, and being operable to an open position to establish a communication, through said connecting pipe, between said supply pipe and said shuttle piston valve and in bypassing relation to said pilot piston valve to effect supply of pressurized fluid from said supply pipe to both sides of said shuttle piston valve simultaneously for equalizing the fluid pressure acting thereon and thereby render said shuttle piston valve ineffective.

14. A fluid pressure brake system as defined in claim 11, further characterized by a pressure fluid supply pipe, via which operating pressurized fluid is supplied to said shuttle piston valve and said pilot piston valve, and an electro-magnet valve device interposed in a connecting pipe between said shuttle piston valve and said supply pipe, said electro-magnet valve device normally occupying a closed position, when deenergized, in which communication through said connecting pipe is closed, and being operable, upon energization thereof responsively to a control impulse, to an open position to establish a communication through said connecting pipe, between said supply pipe and said shuttle piston valve and in bypassing relation to said pilot piston valve to effect supply of pressurized fluid form said supply pipe to both sides of said shuttle piston valve simultaneously for equalizing the fluid pressure acting thereon and thereby render said shuttle piston valve ineffective during such time that said control impulse prevails.

15. A fluid pressure brake system as defined in claim 11, further characterized by a pressure fluid supply pipe, via which operating pressurized fluid is supplied to said shuttle piston valve and said pilot piston valve, and a valve device interposed in a connecting pipe between said shuttle piston valve and said supply pipe, said valve device normally occupying a closed position, in which communication through said connecting pipe is closed, and being operable, in response to control fluid at a predetermined pressure, to an open position to establish a communication, through said connecting pipe, between said supply pipe and said shuttle piston valve and in bypassing relation to said pilot piston valve to effect supply of pressurized fluid from said supply pipe to both sides of said shuttle piston valve simultaneously for equalizing the fluid pressure acting thereon and thereby render said shuttle piston valve ineffective during such time that said control fluid prevails in said valve device.

16. The combination as defined in claim 15, further characterized by means for supplying said control fluid to said valve device at a pressure corresponding to fluid pressure in the brake cylinder for effecting operation of said valve device to its said open position when the pressure of operating fluid supplied to said brake cylinder device exceeds a certain predetermined pressure.

No references cited.